June 14, 1927.
H. W. SANFORD
1,632,149
GREASE GUN CONNECTION
Filed June 12, 1922      3 Sheets-Sheet 1
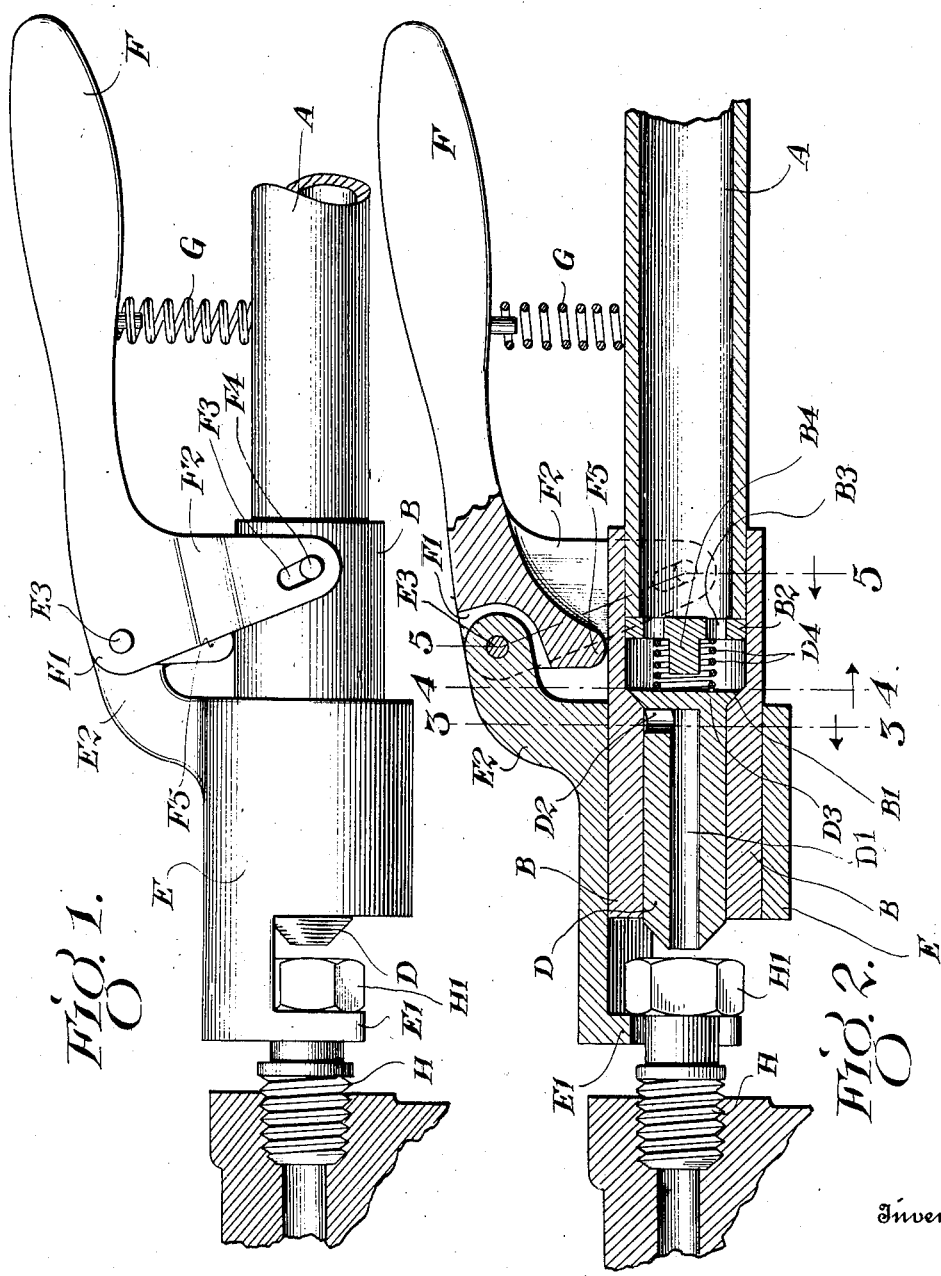
Inventor
Hugh W. Sanford
By Cyrus Kehr
Attorney

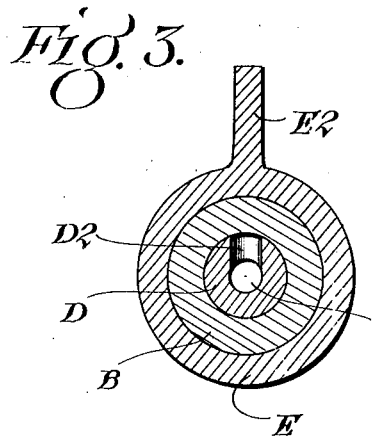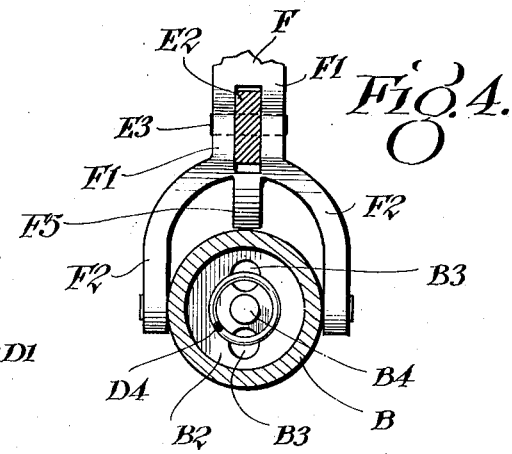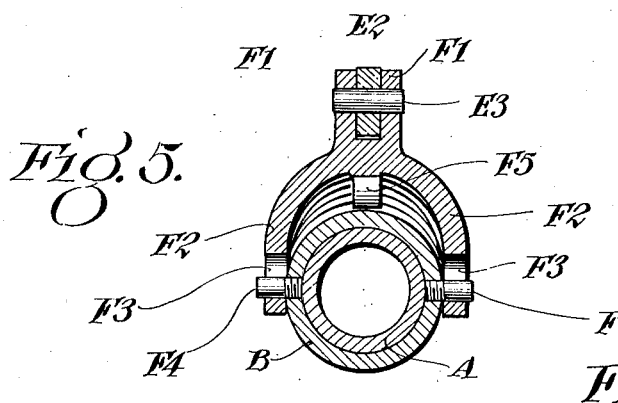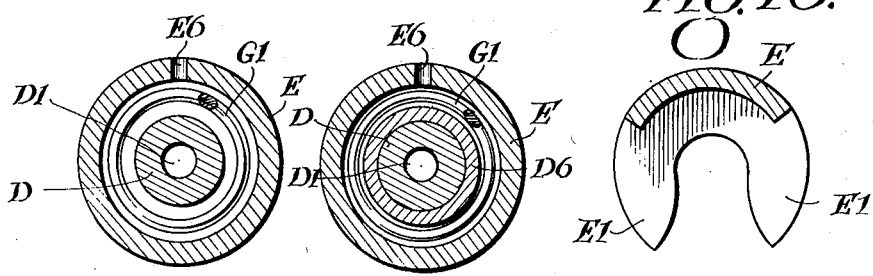

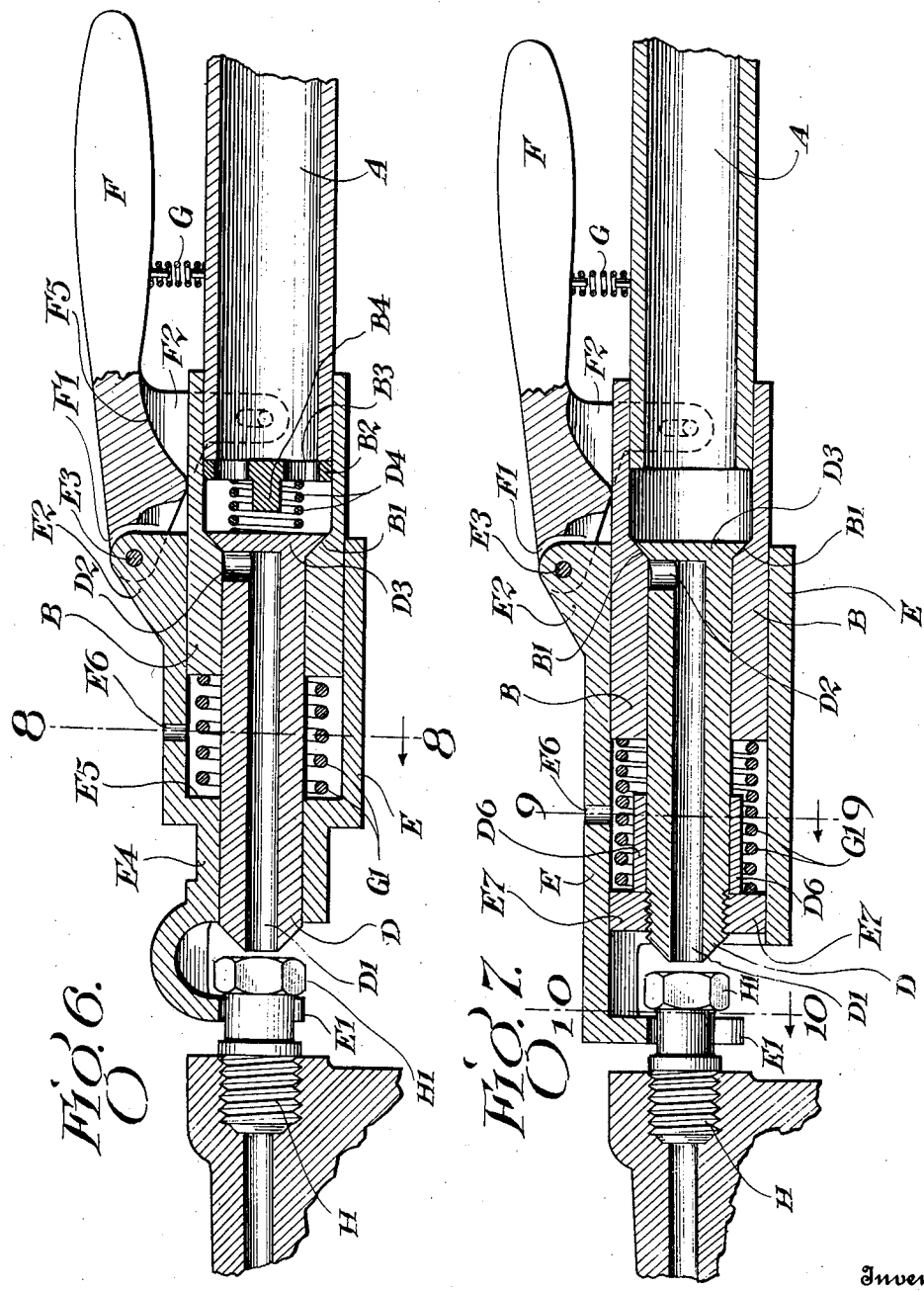

Patented June 14, 1927.

1,632,149

UNITED STATES PATENT OFFICE.

HUGH W. SANFORD, OF KNOXVILLE, TENNESSEE.

GREASE-GUN CONNECTION.

Application filed June 12, 1922. Serial No. 567,593.

This improvement relates particularly to grease gun connections having a member or part adapted to be brought into relation with a grease receiving member and having a tubular nozzle which is adapted to be brought into engagement with said receiving member for delivering into said member grease driven forward through the nozzle or plunger, such engagement being effected by the relative movement of the nozzle and the first mentioned member.

One of the objects of the invention is to provide a form of such structure in which the engagement of the nozzle with the grease receiving member is effected by manual movement of a member of the structure in one direction and release of the nozzle is effected by automatic movement of said member in the opposite direction.

A further object of the invention is to provide in such a structure a combination of elements which will operate to prevent the forward flow of grease through the structure until the nozzle has undergone such relative movement as to effect the seating of the nozzle on the receiving member.

In the accompanying drawings,

Fig. 1 is an elevation of a structure embodying my improvement;

Fig. 2 is a longitudinal section of the same structure;

Fig. 3 is a transverse section on the line, 3—3, of Fig. 2, looking toward the left;

Fig. 4 is a transverse section on the line, 4—4, of Fig. 2, looking toward the right;

Fig. 5 is a transverse section on the line, 5—5, of Fig. 2, looking toward the left;

Fig. 6 is a view similar to Fig. 2, parts of the mechanism being in a different form;

Fig. 7 is a view similar to Fig. 6, parts of the mechanism being in different form;

Fig. 8 is a section on the line, 8—8, of Fig. 6;

Figs. 9 and 10 are sections on the lines, 9—9 and 10—10, respectively of Fig. 7.

Referring first to Figs. 1 to 5, inclusive, A is a flexible transmission tube leading from a grease gun or similar means for delivering grease under pressure through said tube. B is a cylindrical, fixed sleeve in alignment with the tube, A, and having its right hand end surrounding and immovably secured to the left hand end of the tube, A. Forward (toward the left) of the tube, A, the sleeve, B, is contracted internally to form an annular shoulder, $B^1$. Within the sleeve, at the inner end of the tube, A, is a cross partition, $B^2$, having at its middle a forward-directed lug, $B^4$. At each side of said lug the partition has a port, $B^3$.

In the forward or left hand part of the sleeve is a nozzle or plunger, D, slidable in the sleeve and having at its rear end a head, $D^3$, which is normally held against the annular shoulder, $B^1$, by the expanding coiled spring, $D^4$, one end of which is seated against said head and the other end of which is seated against the cross partition, $B^2$. Said spring may yield to allow the nozzle to move rearward relative to the sleeve until its movement is arrested by bearing against the lug, $B^4$.

The forward end of the nozzle is shown tapering to adapt it to fit closely on the grease receiving member. The nozzle has an axial bore, $D^1$, extending from its forward end rearward close to the head, $D^3$. A lateral or side admission port, $D^2$, extends from the rear end of the bore, $D^1$, radially outward through the outer face of the nozzle. When the head, $D^3$, of the nozzle is seated on the shoulder, $B^1$, the port, $D^2$, is covered by the sleeve, B, so that grease can not pass from the tube, A, through the ports, $B^3$, and into the port, $D^2$. But when the nozzle is pushed rearward (rightward) in the sleeve, B, the head, $D^3$, compresses the spring, $D^4$, and the port, $D^2$, or a part thereof, moves rearward beyond the contracted part of the sleeve, whereby said port, or a part thereof, is uncovered for the admission of grease through said port into the bore, $D^1$, of the nozzle.

An outer, movable sleeve, E, slidably surrounds the fixed sleeve, B. At the forward end of the sleeve, E, is a forked hook, $E^1$, which is adapted to extend to opposite sides of the tubular grease receiving member, H, having a head, $H^1$, the hook being forward of said head.

At its rear, the sleeve, E, has an ear, $E^2$, extending rearward and outward and adapted to receive a pintle, $E^3$, which is tangential to a circle which is concentric to the fixed sleeve, B. A handle, F, at the rear of the sleeve, B, has ears, $F^1$, at opposite sides of the ear, $E^2$. The pintle, $E^3$, extends through said three ears and joins the handle to the outer sleeve, E. At the forward end of the handle, an arm, $F^2$, extends downward at each side of the fixed sleeve, B. Each of said arms has an upright slot, F³, which receives a stud, F⁴, fixed on the side of the fixed sleeve, B.

Between the ears, F², the handle has a shoulder, F⁵, adapted to bear against the upper face of the inner sleeve, B, to limit forward movement of the outer sleeve, E. An expanding spring, G, is placed between the handle, F, and the transmission tube, A, and tends to lift the handle.

The operation is as follows:

Normally the spring, G, holds the handle in the raised position for holding the nozzle, D, in its forward position, the head, D³, resting on the shoulder, B¹, and the outer sleeve, E, being in its forward position, the lugs, F⁴, acting as fulcri for forcing the ears, F¹, forward, and the shoulder, F⁵, limiting the forward movement by bearing against the outer face of the sleeve, B. When the sleeve, E, is thus in its forward position, the hook, E¹, and the forward end of the nozzle, D, are separated sufficiently to admit the head, H¹, of the receiving member, H. The connection is to be applied as shown in Figs. 1 and 2 of the drawings, the hook, E¹, embracing the neck of the receiving member, H, forward of the head, H¹, and the nozzle, D, being opposite and near the mouth or port of the receiving member. Now the hand of the operator presses the handle, F, downward toward the transmission tube, A, against the resistance of the spring, G, the turning movement of the handle being on the axial line of the pintle, E³, the head, H¹, of the receiving member holding the sleeve, E, against rearward (rightward) movement. This involves the forward movement of the arms, F², and the lugs, F⁴, whereby the inner sleeve, B, is forced forward (leftward) until the forward end of the nozzle bears against the grease receiving member and the sleeve, B, has thereafter continued forward movement until the lug, B⁴, bears against the head, D³, of the nozzle and arrests further movement of the inner sleeve. The latter part of the movement of the inner sleeve has uncovered the side admission port, D², and grease may now flow from the tube, A, forward through the nozzle into the receiving member.

When the hand of the operator releases the handle, F, the spring, G, presses the handle away from the tube, A, whereby the above-described movements are reversed, the sleeves, B and E, sliding on each other for the separation of the hook, E¹, and the forward end of the nozzle, whereby said members are released from the head of the receiving member. Simultaneously with such sliding movements of the sleeves, the spring, D⁴, drives the nozzle forward in the inner sleeve until its head, D³, again seats on the annular shoulder, B¹, whereby the admission port, D², is again covered and the flow of grease is cut off.

In Fig. 6, the structure is the same as in the preceding figures, excepting that a spring, G¹, is inserted between the inner sleeve, B, and the outer sleeve, E. To provide for this insertion, the outer sleeve, E, is extended forward beyond the sleeve, B, as far as the space to be occupied by the spring and is then contracted to form a neck, E⁴, fitting slidably around the nozzle. Thus an annular shoulder, E⁵, is formed to constitute a seat for the forward end of the spring, the rear end of the spring being seated against the forward end of the inner sleeve, B.

In the outer sleeve, E, opposite the spring, G¹, is a vent port, E⁶, for the escape of any grease that may leak between the inner and the outer sleeves into the chamber occupied by the spring.

The operation of this second form is the same as the operation of the preceding form, excepting that in the second form the outer sleeve, E, slides on the inner sleeve, B, and also on the nozzle, D, and the spring, G¹, serves in addition to the spring, G, to normally relatively hold the outer sleeve in the forward position.

In Fig. 7, the parts are the same as in Fig. 6, excepting that the outer sleeve, E, is not contracted to form the neck, E⁴, and the shoulder, E⁵. On the contrary, said sleeve is formed as in Fig. 2. But the inner sleeve, B, is relatively short as shown in Fig. 6. Instead of the shoulder, E⁵, a ring, E⁷, is threaded around the forward end of the nozzle and is of sufficient diameter to fit slidably into the interior of the outer sleeve. The forward end of the spring, G¹, bears against said ring and tends to move the nozzle forward independently of the sleeve, B. When the nozzle meets the head, H¹, of the receiving member, the sleeve, B, continues to move forward. Between the ring, E⁷, and the inner sleeve, a small sleeve, D⁶, surrounds the nozzle within the spring, G¹. The length of the sleeve, D⁶, is such as to arrest the independent forward movement of the sleeve, B, when the port, D², has been uncovered.

Furthermore, in this form the partition, B², the lug, B⁴, and the spring, D⁴, are omitted, the seating of the head of the nozzle being effected by the spring, G¹. Regarding this form it is to be noted that the ring E⁷, is fixed on the nozzle and that the spring, G¹, pushes on said ring while the other end of the spring abuts against the sleeve, B, whereby force is exerted to move the nozzle forward and to move the sleeve, B, rearward.

Concerning both these forms, it is to be noted that the power of the hand of the operator is used to force the forward end of the nozzle against the receiving member and so hold the nozzle until the movement of grease into the receiving member has been completed. When the hand of the operator releases the handle, the handle is raised automatically by the spring, G, whereby the inner sleeve, B, is relatively moved backward, and that movement carries the nozzle backward away from the receiving member.

I claim as my invention,

1. In a grease gun connection, the combination of an inner sleeve, an outer sleeve slidably surrounding the inner sleeve and having at its forward end means for engaging said outer sleeve relative to a grease receiving member, a handle coupled to said outer sleeve and said inner sleeve, a spring tending to relatively move the outer sleeve forward, a nozzle located in the inner sleeve and adapted to engage the inner sleeve and to have its forward end project out of the inner sleeve when the nozzle reaches its forward or rest position and having a longitudinal bore and a side admission port which is normally covered by the inner sleeve when the nozzle is in its forward position relative to the inner sleeve, a spring tending to press the nozzle into its rest position in the inner sleeve, and means for limiting the rearward movement of the nozzle relative to the inner sleeve, substantially as described.

2. In a grease gun connection, the combination of an inner sleeve, an outer sleeve slidably surrounding the inner sleeve and having at its forward end a hook for engaging said outer sleeve relative to a grease receiving member, a handle coupled to said outer sleeve and said inner sleeve, a spring tending to relatively move the outer sleeve forward, a nozzle located in the inner sleeve and adapted to engage the inner sleeve and to have its forward end project out of the inner sleeve when the nozzle reaches its forward or rest position and having a longitudinal bore and a side admission port which is normally covered by the inner sleeve when the nozzle is in its forward position relative to the inner sleeve, a spring tending to press the nozzle into its rest position in the inner sleeve, and means for limiting the rearward movement of the nozzle relative to the inner sleeve, substantially as described.

3. In a grease gun connection, the combination of an inner sleeve having a shoulder, an outer sleeve slidably surrounding the inner sleeve and having at its forward end means for engaging said outer sleeve relative to a grease receiving member, a handle coupled to said outer sleeve and said inner sleeve, a spring tending to relatively move the outer sleeve forward, a nozzle located in the inner sleeve and having a head adapted to seat on said shoulder and the nozzle having a longitudinal bore and a side admission port which is covered by the inner sleeve when the nozzle is in its forward position relative to the inner sleeve and its forward end projects out of the inner sleeve, a spring tending to press the nozzle into its rest position in the inner sleeve, and means for limiting the rearward movement of the nozzle relative to the inner sleeve, substantially as described.

4. In a grease gun connection, the combination of an inner sleeve having a shoulder, an outer sleeve slidably surrounding the inner sleeve and having at its forward end means for engaging said outer sleeve relative to a grease receiving member, a handle coupled to said outer sleeve and said inner sleeve, a spring tending to relatively move the outer sleeve forward, a nozzle located in the inner sleeve and having a longitudinal bore and a side admission port which is covered by the inner sleeve when the nozzle is in its forward position relative to the inner sleeve and its forward end projects out of the inner sleeve, a spring tending to press the nozzle into its rest position in the inner sleeve, and a cross member in operative relation with the nozzle to limit the relative rearward movement of the nozzle, substantially as described.

5. In a grease gun connection, the combination of an inner sleeve, an outer sleeve slidably surrounding the inner sleeve and having at its forward end means for engaging said outer sleeve relative to a grease receiving member, a handle coupled to said outer sleeve and said inner sleeve and being formed for engagement with the inner sleeve to limit forward movement of said outer sleeve, a spring tending to relatively move the outer sleeve forward, a nozzle located in the inner sleeve and adapted to engage the inner sleeve when the nozzle reaches its forward or rest position and having a longitudinal bore and a side admission port which is covered by the inner sleeve when the nozzle is in its forward position relative to the inner sleeve and its forward end projects out of the inner sleeve, a spring tending to press the nozzle into its rest position in the inner sleeve, and means for limiting the rearward movement of the nozzle relative to the inner sleeve, substantially as described.

6. In a grease gun connection, the combination of an inner sleeve, an outer sleeve slidably surrounding the inner sleeve and having at its forward end means for engaging said outer sleeve relative to a grease receiving member, a handle coupled to the outer sleeve and having ears extending over the sides of the inner sleeve and coupled to said inner sleeve, a spring tending to relatively move the outer sleeve forward, a nozzle located in the inner sleeve and adapted to engage the inner sleeve when the nozzle reaches its forward or rest position and having a longitudinal bore and a side admission port which is covered by the inner sleeve when the nozzle is in its forward position relative to the inner sleeve and its forward end projects out of the inner sleeve, a spring tending to press the nozzle into its rest position in the inner sleeve, and means for limiting the rearward movement of the nozzle relative to the inner sleeve, substantially as described.

7. In a grease gun connection, the combination of an inner sleeve, an outer sleeve slidably surrounding the inner sleeve and having at its forward end means for engaging said outer sleeve relative to a grease receiving member, a handle coupled to the outer sleeve and having slotted ears extended over the sides of the inner sleeve, studs fixed on the inner sleeve and extended into the slots of said ears, a spring tending to relatively move the outer sleeve forward, a nozzle located in the inner sleeve and adapted to engage the inner sleeve when the nozzle reaches its forward or rest position and having a longitudinal bore and a side admission port which is covered by the inner sleeve when the nozzle is in its forward position relative to the inner sleeve and its forward end projects out of the inner sleeve, a spring tending to press the nozzle into its rest position in the inner sleeve, and means for limiting the rearward movement of the nozzle relative to the inner sleeve, substantially as described.

8. In a grease gun connection, the combination of an inner sleeve, an outer sleeve slidably surrounding the inner sleeve and having at its forward end means for engaging said outer sleeve relative to a grease receiving member, a handle coupled to said outer sleeve and said inner sleeve, a spring applied to the handle and tending to move the handle to cause it to relatively move the outer sleeve forward, a nozzle located in the inner sleeve and adapted to engage the inner sleeve when the nozzle reaches its forward or rest position and having a longitudinal bore and a side admission port which is covered by the inner sleeve when the nozzle is in its forward position relative to the inner sleeve and its forward end projects out of the inner sleeve, a spring tending to press the nozzle into its rest position in the inner sleeve, and means for limiting the rearward movement of the nozzle relative to the inner sleeve, substantially as described.

9. In a grease gun connection, the combination of a tubular nozzle adapted to engage the grease receiving member, means confined for movement parallel to said nozzle and adapted to make engagement relative to a grease receiving member, means for normally covering the rear part of the bore of the nozzle, and manually-actuated means for moving the nozzle against the grease receiving member and uncovering the rear part of said bore, and said means being adapted for reversal to retract the nozzle from the receiving member and again cover the rear part of said bore, substantially as described.

10. In a grease gun connection, the combination of means for making engagement relative to a grease receiving member, a tubular nozzle adapted to engage the grease receiving member and between which nozzle and said means there is unobstructed space, means for normally covering the rear part of the bore of the nozzle, and manually-actuated means for moving the nozzle against the grease receiving member and uncovering the rear part of said bore, and elastic means for producing reverse movement for retracting the nozzle from the grease receiving member and again covering the rear part of the bore of the nozzle, substantially as described.

11. In a grease gun connection, the combination of a tubular nozzle to engage a grease receiving member, means confined for movement parallel to said nozzle and adapted to make engagement relative to the grease receiving member, means for normally covering the rear part of the bore of the nozzle, and means including a handle for moving the nozzle against the grease receiving member and uncovering the rear part of said bore, and said means being adapted for reversal to retract the nozzle from the receiving member and again cover the rear part of said bore, substantially as described.

12. In a grease gun connection, the combination of means for making engagement relative to a grease receiving member, a tubular nozzle adapted to engage the grease receiving member and between which nozzle and said means there is unobstructed space, means for normally covering the rear part of the bore of the nozzle, and means including a handle for moving the nozzle against the grease receiving member and uncovering the rear part of said bore, and elastic means for producing reverse movement for retracting the nozzle from the grease receiving member and for again covering the rear part of the bore of the nozzle, substantially as described.

In testimony whereof I have signed my name, this 17th day of May, in the year one thousand nine hundred and twenty-two.

HUGH W. SANFORD.